(12) United States Patent
Ardrey

(10) Patent No.: US 9,771,032 B2
(45) Date of Patent: Sep. 26, 2017

(54) VEHICLE DENT GUARD

(71) Applicant: Mike Ardrey, Raleigh, NC (US)

(72) Inventor: Mike Ardrey, Raleigh, NC (US)

( * ) Notice: Subject to any disclaimer, the term of this patent is extended or adjusted under 35 U.S.C. 154(b) by 0 days.

(21) Appl. No.: 14/643,105

(22) Filed: Mar. 10, 2015

(65) Prior Publication Data

US 2016/0207475 A1   Jul. 21, 2016

Related U.S. Application Data

(60) Provisional application No. 62/041,982, filed on Aug. 26, 2014.

(51) Int. Cl.
*B60R 13/04* (2006.01)

(52) U.S. Cl.
CPC .................... *B60R 13/04* (2013.01)

(58) Field of Classification Search
CPC ....................................................... B60R 13/04
USPC ......................................................... 280/770
See application file for complete search history.

(56) References Cited

U.S. PATENT DOCUMENTS

| | | | | |
|---|---|---|---|---|
| 4,401,331 A * | 8/1983 | Ziner | ...................... | B60R 13/04 280/770 |
| 4,828,303 A * | 5/1989 | Soria | ...................... | B60R 13/04 248/206.3 |
| 5,162,139 A * | 11/1992 | Gomez | ................... | B60R 13/04 248/206.3 |
| 5,320,392 A | 6/1994 | Hart | | |
| 6,406,080 B1 | 6/2002 | Davis | | |
| 7,090,266 B1 | 8/2006 | Price | | |
| 7,229,108 B2 | 6/2007 | Hochrein | | |
| 7,527,320 B1 * | 5/2009 | Nevell, Jr. | ............ | B60R 19/445 293/102 |
| 8,201,860 B2 | 6/2012 | Kalmus | | |
| 8,444,191 B2 * | 5/2013 | Akers | ..................... | B60R 13/04 293/128 |
| 2010/0295325 A1 | 11/2010 | Curtis | | |

* cited by examiner

*Primary Examiner* — John Walters
*Assistant Examiner* — James Triggs
(74) *Attorney, Agent, or Firm* — Global Intellectual Property Agency, LLC; Jordan Sworen

(57) ABSTRACT

A vehicle dent guard for protecting the sides or doors of a vehicle from dents and scratches. The vehicle dent guard is telescopic and includes an outer tubular member having one or more inner tubular members adjustably positioned therein. The tubular members preferably have a semi-cylindrical shape such that one side is rounded and the other side is flat. The flat side can be affixed to the door of a car in a horizontal orientation by means of fasteners thereon, such as magnets. Once installed, the inner tubular members can be extended from the outer tubular member in order to protect the entire width of the vehicle door. In this way, the vehicle dent guard absorbs the impact of a collision so that an object does not directly strike the vehicle door.

9 Claims, 3 Drawing Sheets

VEHICLE DENT GUARD

CROSS REFERENCE TO RELATED APPLICATION

This application claims the benefit of U.S. Provisional Application No. 62/041,982 filed on Aug. 26, 2014. The above identified patent application is herein incorporated by reference in its entirety to provide continuity of disclosure.

BACKGROUND OF THE INVENTION

Field of the Invention

The present invention relates to a vehicle dent guard. More specifically, the present invention provides a telescopic device having a plurality of extendable tubular members, wherein the device can be secured to a door of a vehicle in a horizontal orientation so as to prevent objects that come in contact with the vehicle door from denting or scratching the same.

Parking lots and parking garages often have parking spaces that leave little room between adjacent vehicles when the spaces are filled. As a result, it is common for a driver or passenger of one vehicle to be unable to fully open their door to enter or exit the vehicle without having the door contact an adjacent car. When a person exits a vehicle and opens the door, the door may strike the adjacent vehicle causing a dent or scratch. This type of vehicle damage is difficult to avoid and can be expensive to repair.

Further, vehicles in public parking areas at malls or grocery stores are at risk of being struck by various objects and other vehicles. For example, a shopping cart in a parking lot may roll towards a parked vehicle, striking the vehicle and causing damage thereto. Such low-speed collisions are frequent occurrences in public places and result in scratches and dents to the vehicle. The sides or doors of a vehicle are most vulnerable to this type of damage as the sides of the vehicle lack bumpers or other protective devices. Thus, a device for protecting the sides of a vehicle from scratches and dents in the event of a low-speed collision is desired.

Description of the Prior Art

Devices have been disclosed in the prior art that relate to vehicle dent guards. These include devices that have been patented and published in patent application publications. These devices generally relate to vehicle dent guards comprising elongated members securable to the doors of a vehicle to prevent objects from denting or scratching the vehicle. The following is a list of devices deemed most relevant to the present disclosure, which are herein described for the purposes of highlighting and differentiating the unique aspects of the present invention, and further highlighting the drawbacks existing in the prior art.

One such device, U.S. Published Patent Application Number 2010/0295325 to Curtis discloses a self-coiling dent guard. The self-coiling dent guard comprises a main body having a bi-stable spring strip integrated therein, and the device is securable to a vehicle by means of magnetic fasteners. The bottom of the guard further includes felt thereon for protecting the vehicle when the guard is installed. When not in use, the user may coil the guard for storage. Thus, Curtis fails to disclose a telescopic dent guard having an inner tube adjustably positioned within an outer tube.

Another device, U.S. Pat. No. 5,320,392 to Hart discloses a vehicle body protection pad. The device is removably securable to the doors of a vehicle when the vehicle is parked. The protection pad includes an impact absorbing member with a fabric front surface and a plastic back surface. The device is securable to a vehicle by means of one or more magnetic strips, and the device includes one or more handle holes for holding the pad and fastening a security cable. Thus, Hart fails to disclose a telescopic vehicle dent guard having an inner tube adjustably positioned within an outer tube.

U.S. Pat. No. 7,229,108 to Hochrein discloses a removable device for protecting parked vehicle doors from dents and scratches. The device comprises protective elements joined by a rope and magnetically secured to the vehicle doors. The device further includes a security cord that engages the locked door to prevent theft of the device. Thus, Hochrein fails to disclose a vehicle dent guard including telescopic tubular members that are extendable for use and retractable for storage.

U.S. Pat. No. 7,090,266 to Price discloses a vehicle side protector comprising high density blocks covered with a non-scratch fabric. The high density blocks are disposed on strips of pads. Further, magnetic strips are also included for applying the strips of pads to a vehicle. Thus, Price fails to disclose a telescopic vehicle dent guard, and instead discloses a strip of high-density blocks.

U.S. Pat. No. 6,406,080 to Davis discloses a vehicle door protection assembly. The assembly comprises padded members adapted to be attached to the door and fender of a vehicle. The device further includes shell members for covering the padded members. A vehicle attachment assembly is provided for securing the padded members and shell members to the vehicle. Thus, Davis fails to disclose a telescopic vehicle dent guard that can be retracted for storage and extended for use.

Finally, U.S. Pat. No. 8,201,860 to Kalmus discloses a vehicle door protection device. The device comprises an elongated base having an elongated fin joined to the outer surface thereof that is perpendicular to the base. The base is removably secured to the vehicle by means of magnets. Thus, Kalmus fails to disclose a vehicle dent guard having a telescopic construction.

These prior art devices have several known drawbacks. The devices in the prior art relate to vehicle dent guards of various construction. These devices provide padded members that serve to absorb the impact of a collision to prevent damage from occurring to the vehicle door. However, such devices are elongated members that cannot be collapsed for storage and that must be removed from the vehicle when the vehicle is in use. It can be time consuming an inconvenient for the user to install the vehicle dent guards each time the user parks. Thus, the present invention provides a vehicle dent guard securable to the doors of a vehicle that can be extended for use and retracted for storage.

In light of the devices disclosed in the prior art, it is submitted that the present invention substantially diverges in design elements from the prior art and consequently it is clear that there is a need in the art for an improvement to existing vehicle dent guard devices. In this regard the instant invention substantially fulfills these needs.

SUMMARY OF THE INVENTION

In view of the foregoing disadvantages inherent in the known types of vehicle dent guards now present in the prior art, the present invention provides a new vehicle dent guard wherein the same can be utilized for providing convenience for the user when preventing the doors of a vehicle from being scratched or dented by other vehicles or objects while the vehicle is parked in a public area.

It is therefore an object of the present invention to provide a new and improved vehicle dent guard device that has all of the advantages of the prior art and none of the disadvantages.

It is another object of the present invention to provide a vehicle dent guard having a telescopic construction with an outer tubular member and one or more extendable inner tubular members, such that the device can be extended for use and retracted for storage.

Another object of the present invention is to provide a vehicle dent guard having a magnetic fastener for removably securing the device to a vehicle.

Yet another object of the present invention is to provide a vehicle dent guard having a semi-cylindrical shape, wherein the flat side of the device can be secured to the door of a vehicle.

Another object of the present invention is to provide a vehicle dent guard that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
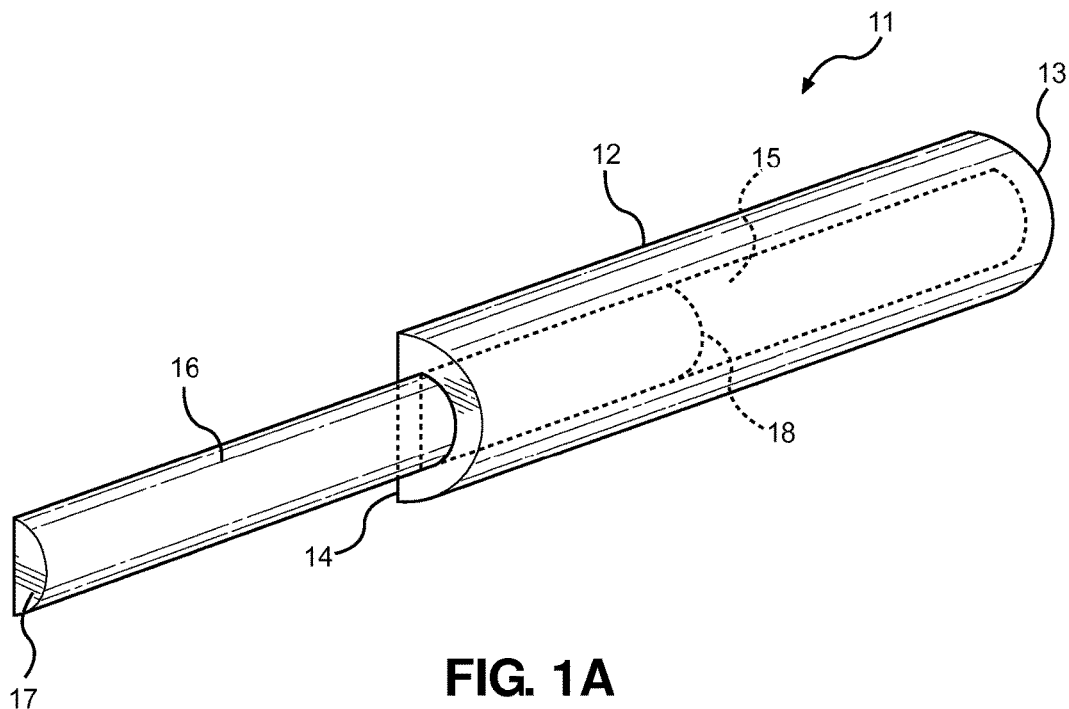
FIG. 1A shows a front perspective view of the vehicle dent guard in an extended configuration.

Reference is made herein to the attached drawings. Like reference numerals are used throughout the drawings to depict like or similar elements of the vehicle dent guard. For the purposes of presenting a brief and clear description of the present invention, the preferred embodiment will be discussed as used for protecting the side of a vehicle from impact from other vehicles or objects. The figures are intended for representative purposes only and should not be considered to be limiting in any respect.

Figure 1B:
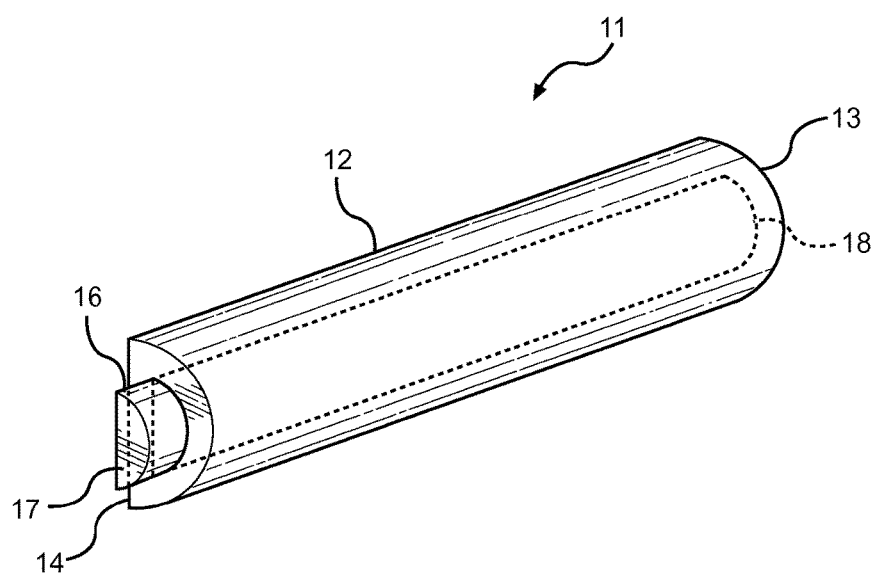
FIG. 1B shows a rear perspective view of the vehicle dent guard in a collapsed configuration.

Referring now to FIGS. 1A and 1B, there are shown perspective views of the vehicle dent guard in extended and collapsed configurations, respectively. The vehicle dent guard 11 comprises a telescopic construction with an outer tubular member and one or more inner tubular members 16. The outer tubular member 12 comprises a closed first end 13, an open second end 14, and a hollow interior volume 15. A first inner tubular member 16 is adjustably disposed within the interior volume 15 of the outer tubular member 12 and is sized so as to fit therein. The inner tubular member 16 includes a first end 18 and a second end 17. The inner tubular member 16 may be solid, or may have a hollow interior volume in which a second inner tubular member is positioned. In embodiments wherein the inner tubular member includes a hollow interior, the inner tubular member also includes a closed end and an open end. The illustrated embodiment provides one inner tubular member, however, in alternate embodiments additional inner tubular members may be included so that the device can be extended to a greater extent. Preferably, the outer and inner tubular members are composed of rubber, foam, or another durable and resilient material. Further, the material is preferably waterproof or water resistant so as to withstand exposure to moisture and precipitation without damage or degradation.

The inner tubular member 16 can be extended from the interior volume 15 of the outer tubular member 12 through the open second end 14 thereof, so as to form the extended configuration. Alternatively, the inner tubular member 16 can be retracted into the interior volume 15 so that the vehicle dent guard 11 is in a collapsed configuration for storage. In the collapsed configuration, the first end 17 of the inner tubular member 16 extends outward slightly from the first end 14 of the outer tubular member. In this way, the user can easily grasp the first end 14 of the inner tubular member 16 and pull it outwards from the interior volume 15 into an extended configuration. Thus, the inner tubular member 16 is sized so as to be slightly longer than the hollow interior volume of the outer tubular member 12.

In some embodiments, the vehicle dent guard 11 may comprise a securement system for allowing the tubular members to be maintained in an extended configuration, and for securing the tubular members in partially extended configurations. Preferably, the securement system comprises a ratcheting mechanism for allowing each tubular member to be incrementally extended from the tubular member in which it is positioned. In this way, the device is prevented from collapsing or extending accidentally or unintentionally.

Figure 2:
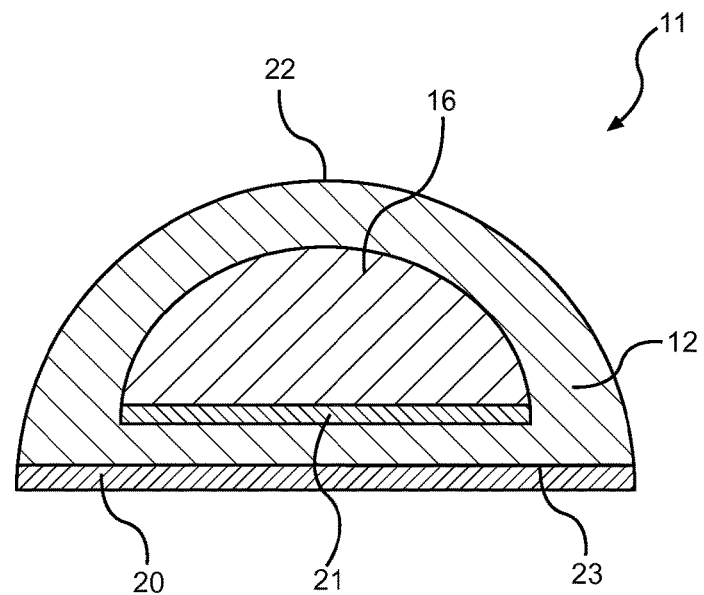
FIG. 2 shows a cross sectional view of an embodiment of the vehicle dent guard.

Referring now to FIG. 2, there is shown a cross sectional view of the vehicle dent guard of the present invention. The outer tubular member 12 preferably comprises a D-shaped cross section. The front portion 22 of the outer tubular member 12 is rounded whereas the rear portion 23 is flat or planar so that the rear portion 23 can be brought into contact with and secured to the outer surface of a vehicle door. The front portion 22 is adapted to absorb the impact of a collision to prevent the vehicle door from being directly contacted. The rear portion 23 includes fasteners 20 thereon for engaging the vehicle door in order to secure the vehicle dent guard 11 to the vehicle door. Preferably, the fasteners 20 comprise magnetic strips for removably securing the device to a vehicle.

The inner tubular member 16 may also comprise a D-shaped cross section, or may alternatively have a semi-cylindrical construction. The rear portion of the inner tubular member 16 also includes a fastener 21 thereon. Again, the fastener 21 is preferably a magnetic strip but may include other types of fasteners in alternate embodiments of the invention. In this way, the inner tubular member 16 and the outer tubular member 12 both contact the surface of the vehicle door. This helps to ensure that the device is maintained in the proper position during use.

Figure 3:
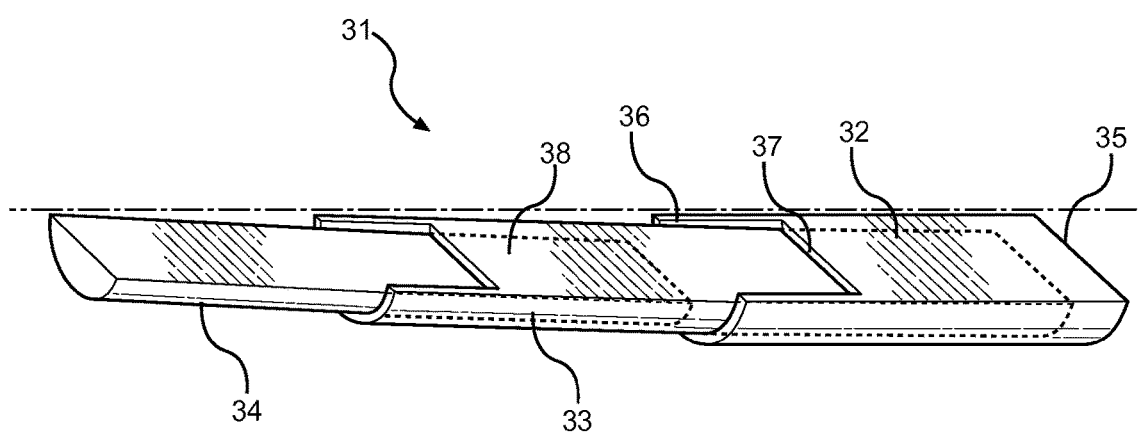
FIG. 3 shows a perspective view of the underside of an embodiment of the vehicle dent guard.

Referring now to FIG. 3, there is shown a perspective view of the underside of an embodiment of the vehicle dent guard. In the illustrated embodiment, the outer tubular member 32 and the inner tubular member 33 include a D-shaped cross section having a cut-out 37 on the underside thereof. The outer tubular member 32 comprises a hollow interior volume, a closed first end 35, and an open second end 36. The base of the outer tubular member extends from the closed first end 35 towards the second end 36, but does not extend entirely to the second end 36. Thus, a cut-out 37 is formed at the second end 36 on the underside of the tubular member.

An inner tubular member 33 extends outward from the cutout 37 and the open second end 36 of the outer tubular member 32. The base 38 of the inner tubular member 32 is angled so that a portion of the base 38 is on the same plane as the base or underside of the outer tubular member 32. In this way, the base of each of the outer tubular member 32 and inner tubular member 33 can rest flush against the exterior surface of a vehicle.

Figure 4:
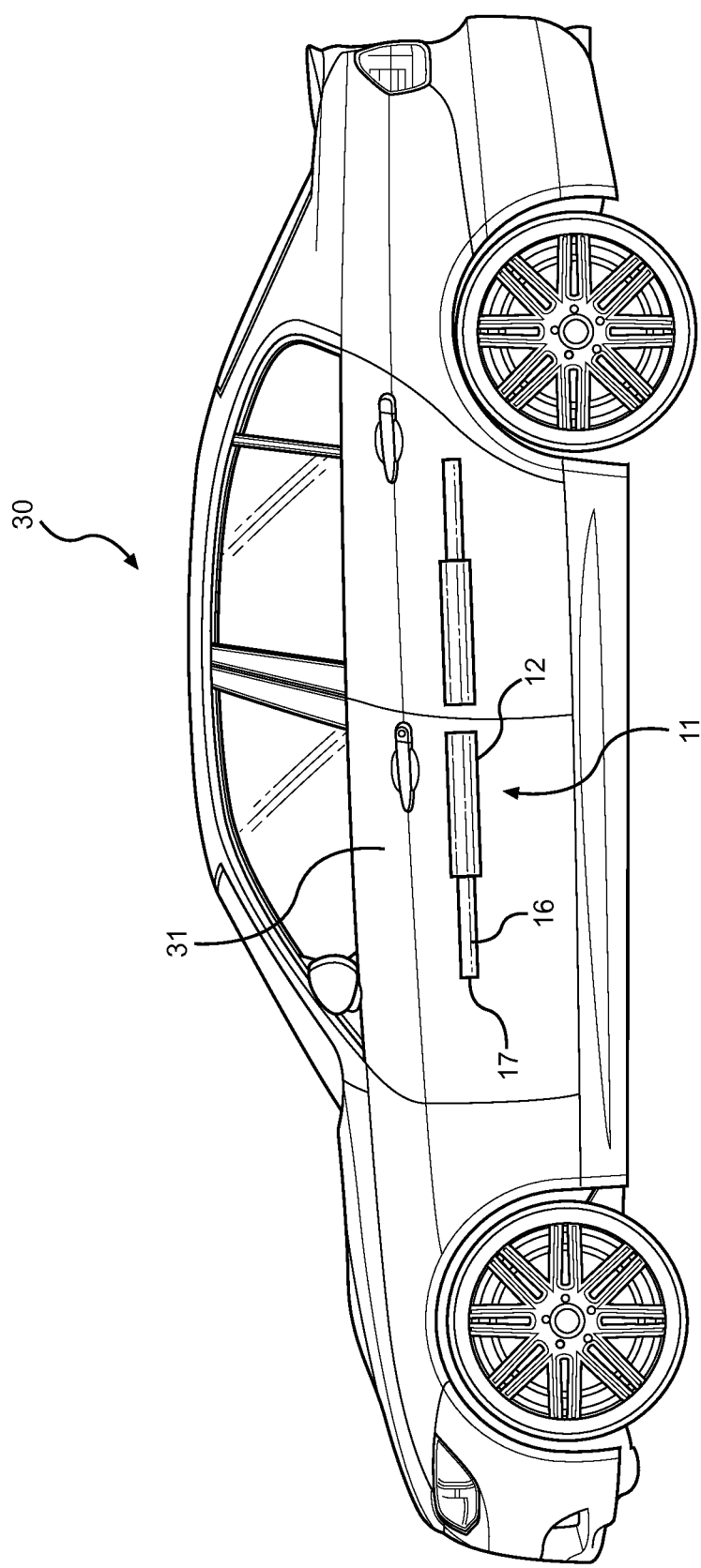
FIG. 4 shows a perspective view of the vehicle dent guard as secured to a vehicle in an extended state.

Referring now to FIG. 4, there is shown a perspective view of the vehicle dent guard as secured to a vehicle in an extended state. In operation, the outer tubular member 12 can be secured to the exterior surface of a door 31 of a vehicle 30 in a horizontal orientation by means of the fastener on the rear of the outer tubular member 12. Preferably, the outer tubular member 12 is secured on the apex of the vehicle door 31, such that the vehicle dent guard 11 is the outermost surface of the door 31. In this way, a vehicle or object that comes into contact with the user's vehicle will contact the vehicle dent guard 11 rather than the vehicle itself. Preferably, one vehicle dent guard 11 is disposed on each of the doors of the vehicle so as to protect each door from contact with another vehicle or object.

During travel, the vehicle dent guard 11 can be disposed in a collapsed configuration such that the inner tubular member or members are enclosed within the outer tubular member 12. This helps to give the vehicle dent guard 11 a small profile so as to not interfere with the aesthetics of the vehicle 30. When the vehicle is parked, the user may grasp the first end 17 of the inner tubular member 16 and draw it outward from the interior volume of the outer tubular member 12 into an extended configuration. The rear surface of the inner tubular member 16 comprises fasteners thereon for securing the inner tubular member 16 to the exterior surface of the door 31. The vehicle dent guard 11 can be extended to the desired extent necessary to cover the door of the vehicle, and thus the vehicle dent guard 11 is suited for use with any of a variety of vehicles of different sizes.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle dent guard, comprising:
    a plurality of telescopic tubular members comprising an outer tubular member and one or more inner tubular members;
    said outer tubular member having a closed first end, and open second end, and a hollow interior volume;
    said one or more inner tubular members slidably disposed within said interior volume of said outer tubular member and extendable therefrom;
    each of the outer tubular member and the one or more inner tubular members including a magnetic strip extending along an underside surface thereof;
    wherein the underside of the inner tubular member and the underside of the outer tubular member each comprise a cut-out;
    the cut-out comprises an open side shared with the open second end of the respective inner tubular member and outer tubular member.

2. The vehicle dent guard of claim 1, wherein said outer tubular member comprises a D-shaped cross section.

3. The vehicle dent guard of claim 1, wherein said one or more inner tubular members comprise a semi-circular cross section.

4. The vehicle dent guard of claim 1, wherein a portion of said one or more inner tubular members extends outward from said open first end of said outer tubular member when in a collapsed configuration.

5. The vehicle dent guard of claim 1, wherein said one or more inner tubular members are extendable outward from said outer tubular member and securable in position by means of a securement device.

6. The vehicle dent guard of claim 1, wherein said one or more inner tubular members are adapted to be extended from said outer tubular member at an angle such that a portion of said one or more inner tubular members crosses a plane defined by an underside surface of said outer tubular member.

7. The vehicle dent guard of claim 1, wherein the vehicle dent guard is securable to an exterior of a vehicle via the magnetic strip of each of the outer tubular member and the one or more inner tubular members without need for additional support.

8. The vehicle dent guard of claim 1, wherein the cut-out comprises a rectangular shape having a closed side disposed between the open side thereof and the closed first end of the respective inner and outer tubular members.

9. The vehicle dent guard of claim 1, wherein the underside of the inner tubular member is angled toward the underside of the second tubular member when the vehicle dent guard is disposed in an extended configuration, such that a portion of the underside of the inner tubular member is on a same plane as the underside of the outer tubular member.

* * * * *